(12) United States Patent
Furniss et al.

(10) Patent No.: US 8,887,585 B2
(45) Date of Patent: Nov. 18, 2014

(54) FORCE-SENSING DEVICE FOR MEASURING A TRACTION-AND/OR PRESSURE FORCE LOAD IN STRUCTURE

(71) Applicant: Tecsis GmbH, Offenbach (DE)

(72) Inventors: Hartmut Furniss, Linkenheim-Hochstetten (DE); Oliver Jost, Langen (DE); Markus Muller, Darmstadt (DE)

(73) Assignee: Tecsis GmbH, Offenbach (DE)

( * ) Notice: Subject to any disclaimer, the term of this patent is extended or adjusted under 35 U.S.C. 154(b) by 93 days.

(21) Appl. No.: 13/684,505

(22) Filed: Nov. 24, 2012

(65) Prior Publication Data
US 2013/0180343 A1 Jul. 18, 2013

(30) Foreign Application Priority Data
Nov. 26, 2011 (DE) .......................... 10 2011 119 577

(51) Int. Cl.
| | |
|---|---|
| G01L 1/00 | (2006.01) |
| G01L 1/20 | (2006.01) |
| B66C 1/66 | (2006.01) |
| B66C 13/16 | (2006.01) |
| G01G 3/14 | (2006.01) |
| G01G 19/18 | (2006.01) |

(52) U.S. Cl.
CPC . G01L 1/20 (2013.01); B66C 1/663 (2013.01); B66C 13/16 (2013.01); G01G 3/1408 (2013.01); G01G 19/18 (2013.01)
USPC .......................................... 73/862.68; 73/862

(58) Field of Classification Search
USPC ...................................................... 73/862.68
See application file for complete search history.

(56) References Cited

U.S. PATENT DOCUMENTS

| | | | | |
|---|---|---|---|---|
| 4,429,579 | A * | 2/1984 | Wilhelm | 73/768 |
| 4,553,124 | A * | 11/1985 | Malicki | 338/5 |
| 4,630,490 | A * | 12/1986 | Malicki | 73/862.629 |
| 4,823,606 | A * | 4/1989 | Malicki | 73/761 |
| 5,291,789 | A * | 3/1994 | Walton | 73/761 |
| 5,339,696 | A * | 8/1994 | Carignan | 73/862.041 |
| 5,392,027 | A * | 2/1995 | Brunot et al. | 340/561 |
| 5,598,738 | A * | 2/1997 | Buescher, Jr. et al. | 73/761 |
| 5,777,239 | A * | 7/1998 | Fuglewicz | 73/862.68 |
| 5,783,751 | A * | 7/1998 | Maw et al. | 73/761 |
| 7,293,466 | B2 * | 11/2007 | Ohta et al. | 73/777 |
| 8,312,778 | B2 * | 11/2012 | Ostling et al. | 73/862.045 |
| 8,365,609 | B2 * | 2/2013 | Shimazu et al. | 73/777 |
| 8,511,174 | B2 * | 8/2013 | Herrmann et al. | 73/774 |
| 8,540,468 | B2 * | 9/2013 | Mekid et al. | 411/13 |
| 2007/0017295 | A1 * | 1/2007 | Ohta et al. | 73/761 |
| 2008/0202225 | A1 * | 8/2008 | Munz et al. | 73/114.43 |

\* cited by examiner

*Primary Examiner* — Lisa Caputo
*Assistant Examiner* — Jamel Williams
(74) *Attorney, Agent, or Firm* — WRB-IP LLP

(57) ABSTRACT

A force-sensing device for measuring a traction- and/or pressure force load in a structure, for example, in a container-locking bolt is provided. The force-sensing device is constructed shaped like a rod and a sensor section detects expansions and/or compressions of the structure.

8 Claims, 4 Drawing Sheets

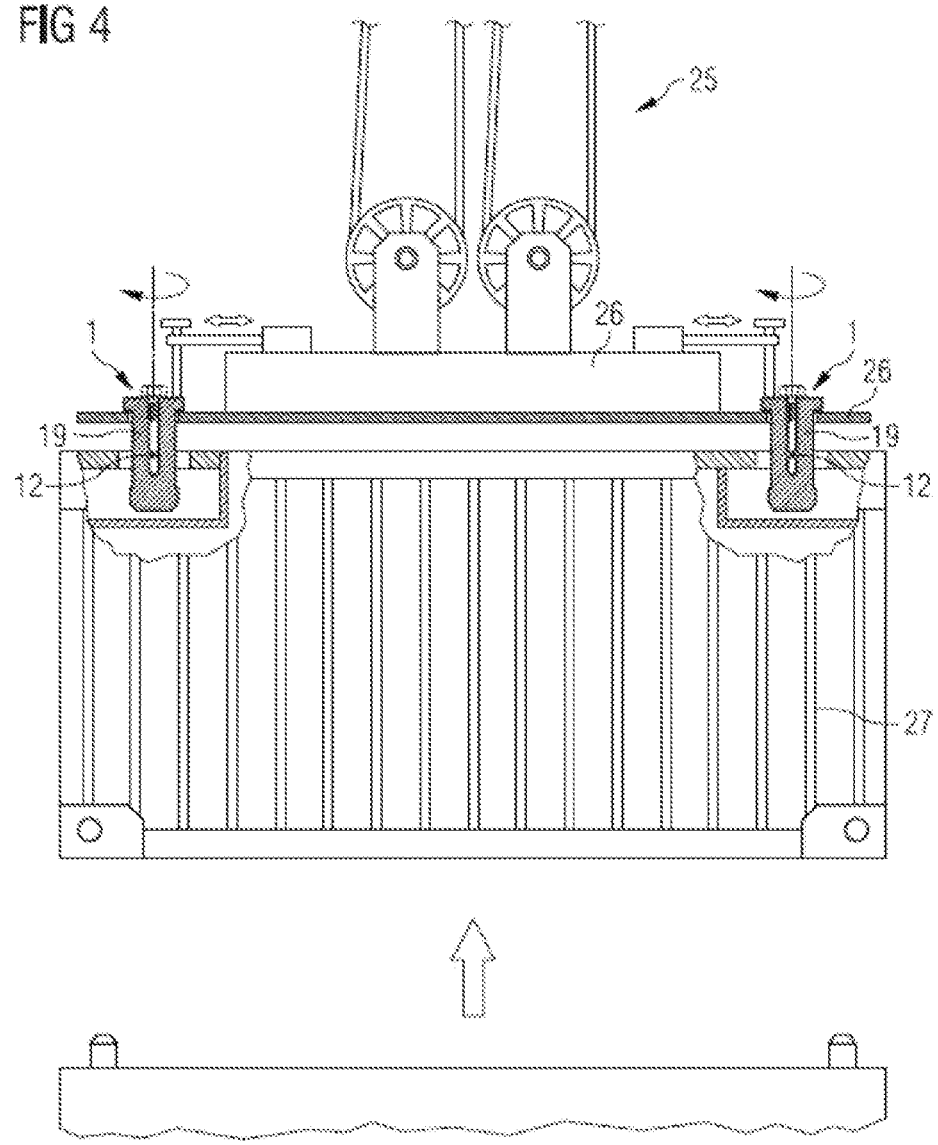

FORCE-SENSING DEVICE FOR MEASURING A TRACTION-AND/OR PRESSURE FORCE LOAD IN STRUCTURE

BACKGROUND AND SUMMARY

The invention relates to a force-sensing device for measuring a traction- and/or pressure force load in a structure, for example, in a bolt, hook, carrier, strut or the like. The force-sensing device comprises a force measuring sensor and a rod-shaped sensor carrier and is intended to be set into the loaded structure so that expansions and/or compressions of the structure under load are transferred to the force-sensing device and can be detected by its force measuring sensor.

It is desirable to provide an economical solution for force measurements in structures. In addition, a construction should be created that can be used to evaluate tractive forces, suspended loads, preferably for lifting devices or cranes.

In a preferred embodiment of an aspect of the invention the force-sensing device has a helical contour that is provided on the one end with a screw head that can be brought in engagement with a screwing tool. Even any other tool attack surface such as, for example, surfaces that contain a hole that can be brought in engagement with a pin as tool are conceivable as screw head. Therefore, it is also designated in the following as a force measuring dowel or an expansion measuring screw.

The force measuring dowel has a threaded section behind the head with which it can be screwed into a bore. On the other end the force measuring dowel has a tip via which the forces to be measured can be introduced into the force measuring dowel and has a middle or front section in which the force measuring sensor is fastened. The force measuring sensor consists of or comprises an element that can receive expansion and compression. The sensor is preferably constructed as a metallic thin-film element that is welded into the structure of the force measuring dowel.

At least four measuring resistors are integrated on the thin-film measuring element. Of them, two measuring resistors are applied for receiving expansion and two measuring resistors for receiving compression. The resistors are evaluated via a Wheatstone circuit and are run to the screw head via a cable lead-through to the other screw end and evaluated by an electronic component or by a display.

The welded-in force measuring sensor becomes a component of the structure of the expansion measuring screw and is elastically shaped or deformed when the expansion measuring screw is loaded or when the load is removed from it. The elastic deformations or shapings are introduced via the tip of the expansion measuring screw and conducted out via the threaded section. The sensor measuring resistors loaded at this time generate changes in resistance that are evaluated. As a result of the sensor construction, that is to be viewed as an atomic bond between the metallic sensor body and the layer to be measured, this construction has the particular advantage of being temperature-stable and zero-point-stable for a long time. A thin-film measuring sensor of high-grade steel, provided with a layer of glass is preferably used. Measuring resistors of a metallic type are again vaporized on and provided with contact pads and connected, e.g., by cable and evaluated.

Such a screw is brought, for example, into the structure of a load measuring hook. To this end the load measuring hook has a central bore provided on the upper end with a thread. The expansion measuring screw is inserted into this bore and tightened and pre-tensioned, during which preferably some air always remains at the upper screw head or the screw head therefore remains at a slight distance from the load measuring hook or its upper surface. This brings it about that when the screw is tightened in a defined manner and secured, it makes contact at the bottom of the bore with the load measuring hook and that the force measuring screw is subjected to a pre-tensioning. The middle and front section of the force measuring screw is placed under tension in such a manner by the forces applied by the screwing tool via the upper threading on the screw in engagement with the load measuring hook that a certain pre-loading is adjusted at which the sensor element experiences a predefined pre-tensioning. In the following this achieved deformation is evaluated with a non-loaded load hook and defined as the zero point.

When the load measuring hook is loaded it is extended in length and the force measuring screw, that is under pre-tension, is partially relieved of the load.

If the round force measuring sensor consisting of or comprising high-grade steel was deformed slightly elliptically under pre-tensioning a change in the measuring resistors occurs during the loading of the loading hook by the relieving of the load. During the relieving of the load on the round expansion measuring sensor this sensor is returned back from the elliptical form into the previously round form.

This deformation or removal of the load from the measuring section can be associated in a linear manner with the load on the load measuring hook as a function of the load on the load measuring hook. The load measuring hook can also be constructed as a bolt that is held front the outside on an outer section, whereby its lower, free end has a projection with a positive receptacle for a suspension by force.

When four such bolts are used, they can also preferably be locked in container corners and be used in lifting devices for containers.

In this case, e.g., the measuring signal can be evaluated on all bolts at the four corners of the container and the total weight of the container determined.

Thus, however, it can also be determined when the container is lifted whether it is still locked at its lower section on a receptacle or is being taken up in a freely suspended manner.

Furthermore, in the case of a freely-suspended container locked in an orderly manner a conclusion can be made by the evaluation of the four bolts provided with this described measuring technology about the load distribution and the distribution of cargo in the container itself.

Upon the detection of an inadmissible load of a bolt relative to the others a clamping of the container during lifting can be assumed and a rapid turning off of the lifting crane can be initiated.

SHORT DESCRIPTION OF THE DRAWINGS

FIG. 4 shows a lifting device for a container that is connected to the lifting device via the loading hook with a force measuring dowel arranged on it.

DETAILED DESCRIPTION

Figure 1:
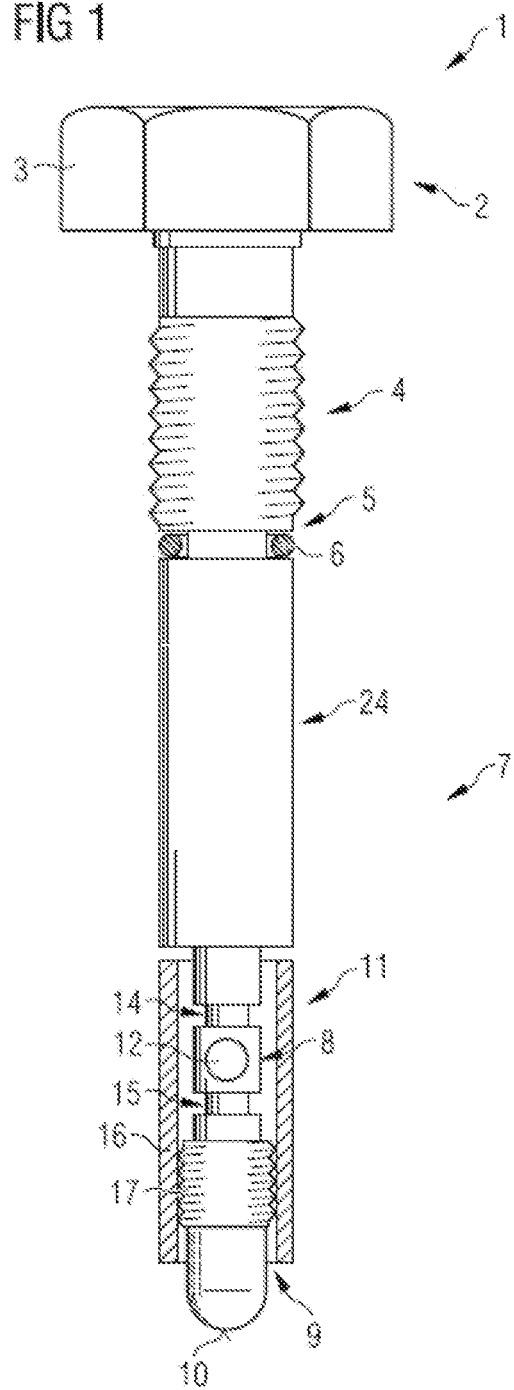
FIG. 1 shows a force measuring dowel.
Figure 2:
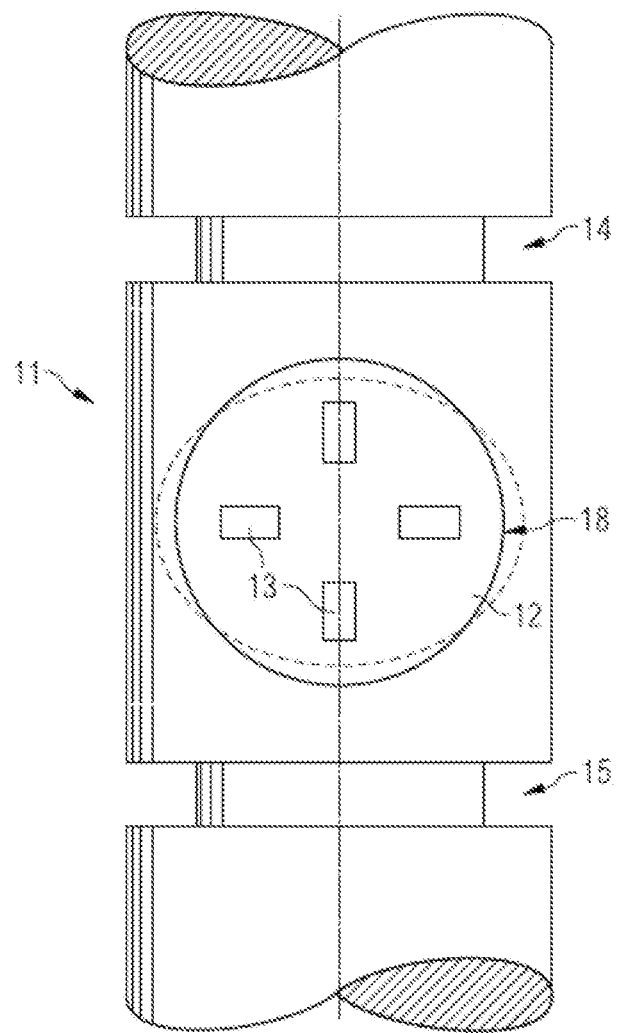
FIG. 2 shows a sensor section of the force measuring dowel.
Figure 3:
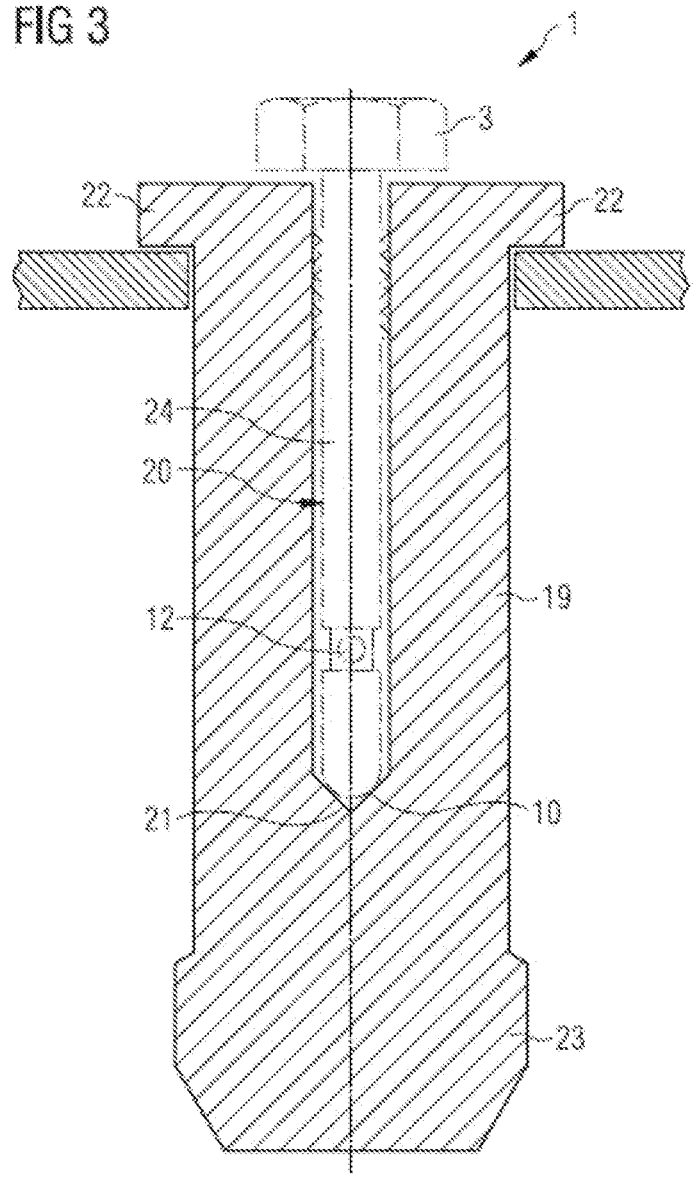
FIG. 3 shows the applied force measuring dowel in a loading hook.

A force measuring dowel shown in the FIGS. 1 to 3 preferably has a hexagon head 3 on its upper end 2 for engaging with a tool key with which the force measuring dowel 1 can be screwed into a structure. To this end it has a threaded section 4 under the hexagon head 3 and has a recess 5 for an O ring 6 with which a lower bore section in the load measuring hook and/or a lower, approximately rod-shaped section 7 of the force measuring dowel 1 can be sealed. The force measuring dowel 1 is used as a sensor carrier, whereby a sensor device 8 is arranged in the lower section 7. The sensor device 8 is protected from contamination in this manner.

Furthermore, the force measuring dowel 1 has a contact section 9 on a tip opposite the upper end 2, which section 9 has a preferably spherical front surface and a measuring position 10 for introducing the pre-tensioning forces and has a measuring section or sensor section 11 with a round thin-wire sensor 12 provided with the four measuring resistors 13 in order to receive compressions and expansions and convert them into a force measuring signal.

This measuring section 11 is preferably provided with relief grooves 14, 15 so that the forces act centrally on the thin-film measuring sensor 12 and the deformation can be maximized. The force measuring dowel 1 can be adapted to the desired loading range and measuring range as a function of the design of the diameter of the sensor section 11, in which the force measuring sensor 12 rests.

However, the measuring, range for the expansion measuring screw can be changed not only by changing the recesses 14, 15 or the diameter but also by a casing 16 shown here that can be pushed over the measuring section 11 and screwed to the force measuring dowel 1 in a threaded section 17. If this casing 16 is pushed from the outside over the measuring section and tightened, the applied forces are conducted not only via the force measuring dowel 1 into the measuring section 11, but also partially via the outer casing 16. This change of rigidity brings it about that the measuring section 11 is not exposed to the full load, but rather only to the part that is conducted centrally through the screw and the force measuring dowel 1. Thus, a greater part of the forces is conducted around the sensor 12, depending on the design of an outer casing 16. Thus, the force measuring dowel 1 can be adjusted to different force loads by different casings 16. It is also conceivable that it is possible to switch quasi back-and-forth by tightening the casing 16 or loosening the casing 16.

FIG. 2 shows the measuring section 11 of this force measuring dowel 1. The round thin film sensor 12 is shown here that receives compressions and expansions by the four measuring resistors 13. The thin film sensor 12 can be welded in, as shown here, or also be adhered in or pressed in that is, connected with both having the same substance, non-positively or positively to the force measuring dowel 1.

It is furthermore conceivable that it is also used rotated through an angle of 45°.

The form 18 shown in dotted lines in FIG. 2 is the thin film sensor 12 under load. Here, the round sensor 12 assumes an elliptical form. The load is applied onto the force measuring dowel 1 in that the latter is screwed in a pre-defined manner into a structure, for example, into a load measuring hook and tightened. The torque can preferably be determined here during tightening or tightened over a pre-defined length of the force measuring dowel 1. Upon the application of this load into the non-loaded load measuring book the sensor 12 is therefore deformed in a defined manner and the electrical signal evaluated at this time is defined via the four measuring resistors 13 or the Wheatstone bridge as the zero point. Upon the loading of the load measuring hook or of the structure to be analyzed the latter is partially expanded and the force measuring dowel 1 pre-tensioned in the structure is partially relieved of load.

The relieving of the load can be evaluated in the thin film sensor 12 and evaluated as a measured value by an electronic component and outputted in an analog or digital manner.

FIG. 3 shows such a load measuring hook 19 that has a central bore 20 into which the force measuring dowel 1 is screwed. Here, the force is introduced via the bore bottom 21 onto the tip 9 of the force measuring dowel 1 and is forwarded via the sensor element 12 upward to the threaded holding fixture 4. The thread 4 and the screw head 2, via which the force is conducted out, are shown on the upper section.

Such a load measuring hook 19 is placed, for example, in a rotatable manner on its two outer shoulders 22. The load measuring hook 19 has at receiver 23 on the lower end that can be positively locked in containers that are not shown in detail. Such contours are preferably rotated for locking and brought in engagement with containers, whereby four are then used at all corners.

An intermediate section 24 can be arranged between the threaded section 4 and the sensor section 11 and/or between the sensor section 11 and the contact section 9.

FIG. 4 shows an exemplary example of use for the load measuring hook 19 with the force measuring dowel 1 arranged in it. A lifting device 25, for example, a container bridge, comprises a height-adjustable receiving device 26 whose rectangular shape is adapted to the dimensions of a container 27. The receiving device 26 is connected to the container 27 at all four corners via as load measuring hook 19. If the receiving device 26 is lifted by the lifting device 25 the load measuring hooks 19 engage with the container 27 at the receivers 23 and lift the container 27. The load measuring hooks 19 are loaded by traction and expand in the longitudinal direction as a function of the weight of the container 27. The longitudinal change of the load measuring hooks 19 leads to a corresponding expansion of the central bores 21 located in the load measuring, hooks 19 and to a removal of the load on the pre-tensioned and therefore deformed force measuring sensor 12, that is located in the sensor range 11 of the force measuring dowel 1, that is arranged in the central bore 21 of the load measuring hook 19. The greater the force of the container 27 is, the stronger the load measuring hook 19 is expanded during a lifting of the container 27 and the greater the deformation of the pre-tensioned force measuring sensor 12, whose measuring signals can be evaluated.

It is also possible to use such a force measuring dowel for checking and monitoring structural parts that are loaded by traction or pressure such as, for example, screws or struts. The force measuring dowel can be arranged for this purpose at a suitable position in to mast or in a crane or in general in a carrier structure constructed by interconnected struts. Measured values can be detected at intervals of time or continuously and checked to see whether a given threshold value for a maximally admissible mechanical stress is being exceeded. It is also conceivable to integrate a force measuring dowel in an anchor fastening of a support wall in order to obtain information about the actually existing loads and forces that are acting on the support wall and must be removed.

The invention is not limited to the previous, detailed exemplary embodiments. It can be modified in the scope of the following claims. It is furthermore conceivable that the force measuring dowel 1 can also be screwed into other structures such as, e.g., fastening anchors for support walls or other machine parts or fastening means.

The invention claimed is:

1. A force-sensing device for measuring a tractive force load and/or a pressure force load on the structure, with a force measuring sensor and a rod-shaped sensor carrier with a first end and a second end, wherein the sensor carrier consists substantially of an elastically deformable material, and the sensor carrier comprises in a sequence from its first end to its second end
a head section,
a threaded section,
a sensor section, and
a contact section,
wherein the head section comprises a tool attack surface,
wherein the threaded section is intended to engage with a counterthread of the structure,
wherein the force measuring sensor is fastened on the sensor section in such a manner that an elastic deformation of the sensor section is transmitted to the force measuring sensor,
wherein the force measuring sensor is constructed in such a manner that it can supply an electrical output signal that varies with a deformation of the force measuring sensor, and
wherein the contact section has a front surface that is intended to rest on a countersurface of the structure,
wherein the front surface of the contact section is constructed as a calotte shell.

2. The force-sensing device according to claim 1, wherein a bore running transversely to the longitudinal axis of the sensor carrier is constructed in the sensor section, into which bore the force measuring sensor is inserted.

3. The force-sensing device according to claim 1, wherein the force measuring sensor is a metallic thin-film sensor with a cylindrical body whose front surface is constructed as a membrane that carries measuring resistors, wherein the membrane plane is aligned parallel to the longitudinal axis of the sensor carrier and wherein the metallic thin-film sensor is welded or pressed into the sensor section or is joined non-positively, with both having the same substance, or positively.

4. The force-sensing device according to claim 3, wherein the membrane carries four measuring resistors that are connected to a Wheatstone bridge.

5. The force-sensing device according to claim 1, comprising a circumferential groove designed on the sensor section on the side of the force measuring sensor which side faces the first end and/or the second end of the sensor carrier.

6. The force-sensing device according to claim 1, comprising a shoulder formed on the sensor carrier on the side of the force measuring sensor which side faces the first end of the sensor carrier, and by a casing that is screwed onto the sensor carrier by a thread formed on the on the sensor carrier on the side of the force measuring sensor which side faces the second end of the sensor carrier, wherein the casing has such a length and the shoulder is formed in such a manner that the casing can come to rest on the shoulder when screwed onto the sensor carrier.

7. A method for measuring a traction- and/or pressure force load in a structure by a force sensing device that comprises a force measuring sensor and a rod-shaped sensor carrier that comprises a head section, a threaded section, a sensor section to which the force measuring sensor is fastened, and comprises a contact section with a front surface and wherein the structure has a bore for receiving the force-sensing device, which bore run substantially in the direction of the force load of the structure, comprising
screwing the force-sensing device into the bore of the structure so that the threaded section of the sensor carrier is brought into engagement with a counterthread constructed in the bore,
the force-sensing device being screwed so far into the bore that at first the front surface of the contact section comes to rest on a countersurface constructed in the bore, and that, finally, the sensor carrier is elastically compressed and pre-tensioned in its area between the front surface and the threaded surface on account of the resistance of the countersurface,
as a result of the compression of the sensor carrier on the force measuring sensor, a corresponding elastic deformation and a pre-determined pre-tension are adjusted,
supplying an electrical output signal from the force measuring sensor during the pre-determined pre-tension to serve as a reference signal, and
measuring an instantaneous loading of the structure by force that brings about a deformation of the structure as a difference between the reference signal of the force measuring sensor and an instantaneous output signal of the force measuring sensor,
wherein in order to measure a tractive force load of the structure the predetermined pre-tension is adjusted in such a manner that the reference signal corresponds to the upper value of the measuring span of the force measuring sensor so that the pre-tensioned force measuring sensor is increasingly relieved of load as the tractive force load of the structure increases.

8. A method for measuring a traction- and/or pressure force load in a structure by a force sensing device that comprises a force measuring sensor and a rod-shaped sensor carrier that comprises a head section, a threaded section, a sensor section to which the force measuring sensor is fastened, and comprises a contact section with a front surface, and wherein the structure has a bore for receiving the force-sensing device, which bore run substantially in the direction of the force load of the structure, comprising
screwing the force-sensing device into the bore of the structure so that the threaded section of the sensor carrier is brought into engagement with a counterthread constructed in the bore,
the force-sensing device being screwed so far into the bore that at first the front surface of the contact section comes to rest on a countersurface constructed in the bore, and that, finally, the sensor carrier is elastically compressed and pre-tensioned in its area between the front surface and the threaded surface on account of the resistance of the countersurface,
as a result of the compression of the sensor carrier on the force measuring sensor, a corresponding elastic deformation and a pre-determined pre-tension are adjusted,
supplying an electrical output signal from the force measuring sensor during the pre-determined pre-tension to serve as a reference signal, and
measuring an instantaneous loading of the structure by force that brings about a deformation of the structure as a difference between the reference signal of the force measuring sensor and an instantaneous output signal of the force measuring sensor,
wherein the compression of the sensor carrier is controlled during the screwing in of the force-sensing device in that the sensor carrier is stiffened more or less by a screwed-on casing.

* * * * *